United States Patent [19]

Balletto

[11] 3,847,407
[45] Nov. 12, 1974

[54] TRACTION DEVICE FOR TRAILERS

[76] Inventor: Norman Philip Balletto, 181 Van Dusen Blvd., Toronto, Ontario, Canada

[22] Filed: May 12, 1972

[21] Appl. No.: 240,219

[52] U.S. Cl. ............................................... 280/46
[51] Int. Cl. .............................................. B62b 1/08
[58] Field of Search ........................... 280/46, 47.24

[56] References Cited
UNITED STATES PATENTS

| | | | |
|---|---|---|---|
| 2,472,989 | 6/1949 | Skipper | 280/46 |
| 3,189,365 | 6/1965 | Blacher | 280/47.24 |
| 3,698,736 | 10/1972 | Shape | 280/46 |

FOREIGN PATENTS OR APPLICATIONS

| | | | |
|---|---|---|---|
| 415,837 | 9/1934 | Great Britain | 280/46 |

*Primary Examiner*—Robert R. Song
*Attorney, Agent, or Firm*—Fetherstonhaugh & Co.

[57] ABSTRACT

A traction device for lifting and towing a trailer or the like comprises a frame, a pair of wheels mounted on the frame and a ball-shaped coupling member mounted on the frame. The ball-shaped coupling member is adapted to engage and disengage complementary socket coupling means carried by a trailer. A manually engageable handle is mounted on and extends rearwardly from the frame. The handle is adapted to move the frame about the axle of the wheels to move the coupling ball from a first lowered position in which the ball-shaped coupling means may engage a trailer coupling means and a second position disposed above the axis of rotation of the axle for guidably supporting the trailer. The ball-shaped coupling means projects outwardly from the frame and handle means in a radial direction with respect to the axle a distance sufficient to provide a substantial clearance between the frame, handle means and coupling means which is to be engaged so as to permit the ball coupling to be located in the first lowered position with the frame and handle means spaced from the coupling means of a trailer. A major portion of the manually engageable handle means has an axis which extends substantially less than 90° relative to the axis passing through the axle and through the centre of the ball coupling whereby the handle may be located in a lowered locked position with the ball coupling located at the opposite side of the axle.

1 Claim, 5 Drawing Figures

PATENTED NOV 12 1974　　　　　　　　　　　　　　3,847,407

TRACTION DEVICE FOR TRAILERS

This invention relates to a traction device for trailers or the like.

In particular this invention relates to a traction device suitable for manually moving and manipulating trailers of the type commonly pulled by automobiles, trucks, and the like.

Normally, when a trailer is disconnected from an automobile, truck or the like, the coupling end is lowered onto the ground and is supported by a skid or support leg in a slightly elevated position. To move the trailer after it has been disconnected from the automobile or tractor it is necessary to lift the coupling end of the trailer frame off of the ground and simultaneously push or pull the trailer. This is an awkward and dangerous practice as it does not provide sufficient control over the movement of the trailer.

The present invention overcomes the difficulties which are described above by providing a traction device which is simple and inexpensive to manufacture and which provides controlled manual manipulation and movement of a trailer or the like.

According to an embodiment of this invention a traction device for a trailer or the like comprises a frame, wheel means rotatably mounted on and supporting the frame and coupling means carried by the frame and adapted to operably engage with and disengage from complementary coupling means carried by the trailer and manually engageably means for moving and manipulating said traction device to move a trailer or the like.

The invention will be more clearly understood after reference to the following detailed specification read in conjunction with the drawings, wherein.

Figure 1:
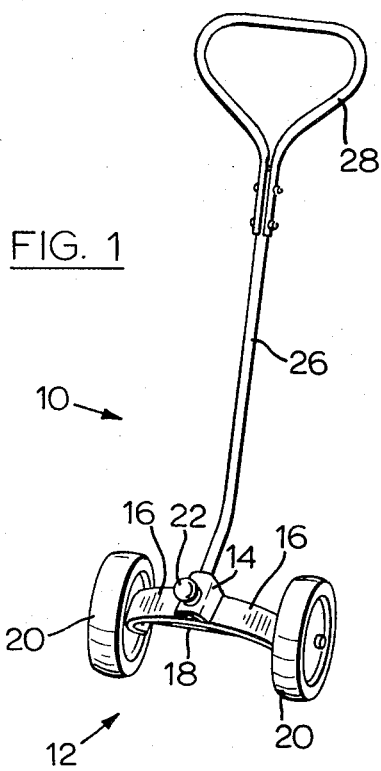
FIG. 1 is a perspective view of a traction device according to an embodiment of the present invention.

With reference to the drawings the reference numeral 10 refers generally to a traction device according to an embodiment of the present invention. The device consists of a frame generally indicated by the reference numeral 12 which includes a support platform 14, having an arch 16 curving downwardly therefrom. An axle 18 is carried by the lower end of the arch 16 and a pair of wheels 20 are rotatably mounted on opposite ends of the axle 18.

A ball-shaped coupling member 22 is rigidly mounted on a platform 14 in a well known manner. It will be noted that the upper surface of the platform 14 and therefore the ball socket 22 is located radially outwardly from the outer circumference of the tyres 20 as shown by the arrows indicated at 24.

A handle 26 extends outwardly from the frame 12 and has a free upper end which is suitably formed to be manually engageable. The handle 26 may be employed to move the frame 12 relative to the axle 18 to move the ball coupling 22 between a first lowered position where it is able to engage the socket carried by the end of a trailer when it is at rest and a second elevated position wherein the traction device carries the weight of the trailer and the trailer may be moved by applying a pulling or pushing force to the handle 26. The ball shaped coupling member 22 is particularly suitable in that it corresponds to the form of coupling normally used by connecting a trailer to an automobile and in the traction device of the present invention the ball type coupling permits the traction device to be used for steering the trailer.

It will be noted that when the ball coupling 22 is in the elevated position it is also disposed vertically above the axis of rotation of the wheels such that the weight of the trailer is carried by the wheels rather than the handle 26.

Figure 2:
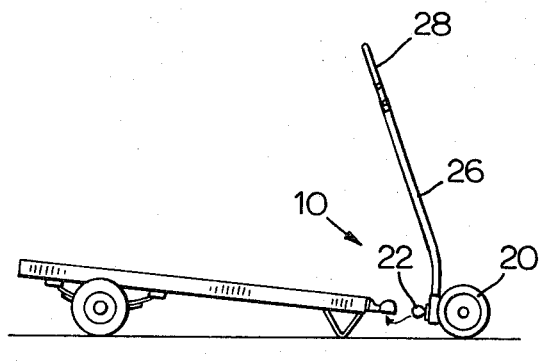
FIG. 2 is a diagrammatic side view of the traction device and a trailer showing the first step in the use of the device.
Figure 3:
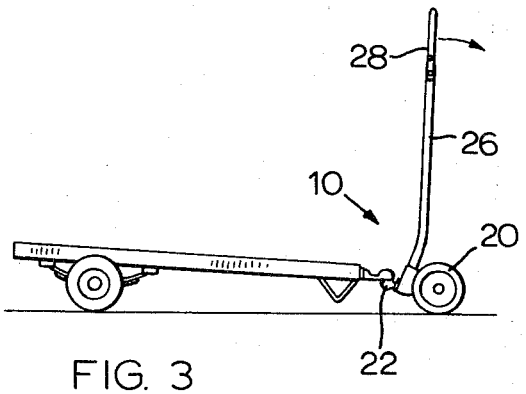
FIG. 3 is a partial view similar to FIG. 2 showing the engagement of the coupling means.
Figure 4:
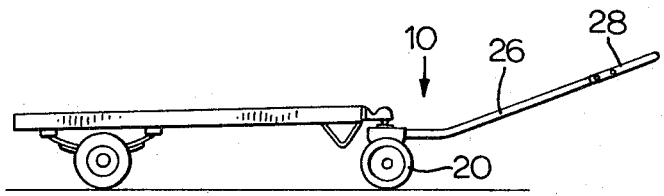
FIG. 4 is a side view similar to FIG. 2 showing the trailer coupled to the traction device for movement.
Figure 5:
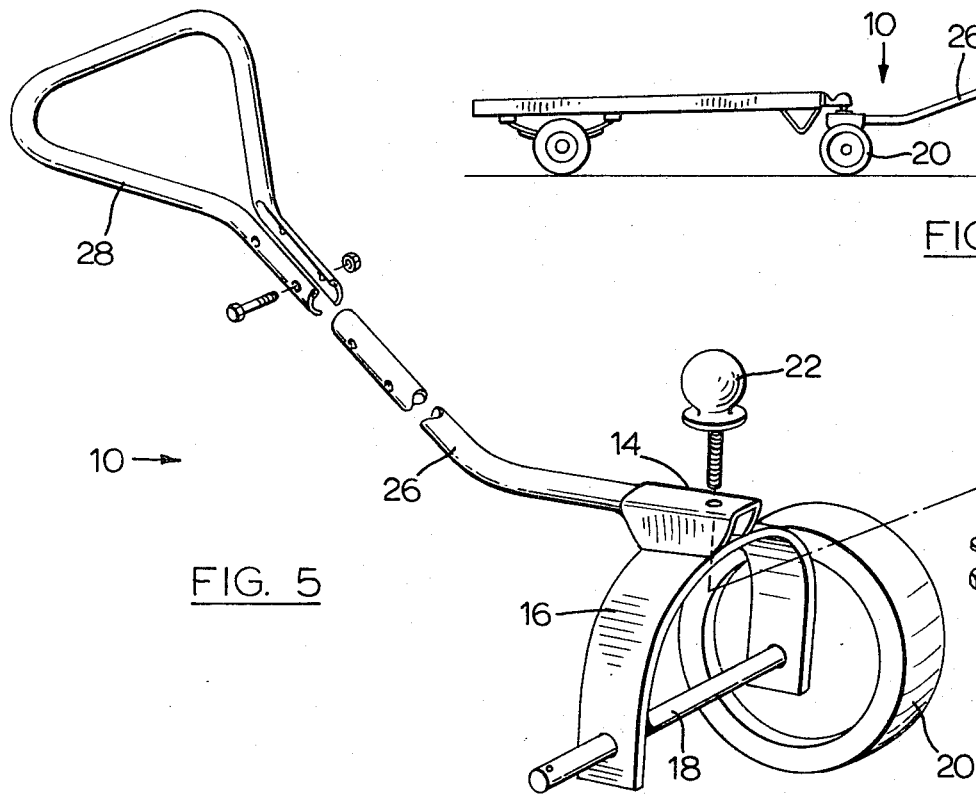
FIG. 5 is a breakdown of the traction device. This breakdown enables the device to be packed in a small carton for shipping and storing.

When the traction device is to be used the ball coupling 22 is moved to the position shown in FIG. 2 wherein it is engageable with the ball socket carried by the trailer. This first position is achieved by moving the handle 26 relative to the wheels 20 in the direction of the arrow shown in FIG. 2. When the coupling means are engaged this handle 26 is moved in the direction indicated by the arrow in FIG. 3 to elevate the front end of the trailer. This movement of the handle continues until the position illustrated in FIG. 4 is reached. In the position illustrated in FIG. 4 it will be noted that the ball coupling is located vertically above the axis of the wheels such that little or no turning movement is applied about the axis by the weight of the trailer. The traction device can be removed by a reversal of the procedure outlined above.

It will be clearly evident from the aforegoing description of the structure of the traction device it is simple and inexpensive to manufacture and may easily be carried as an accessory with the trailer.

Various modifications of this invention will be apparent to those skilled in the art without departing from the scope of the invention. For example the handle 26 may be telescopic or formed with a suitable coupling such that the device may form a compact collapsed package suitable for storing in the trunk of an automobile or in a suitable mounting on the trailer.

Also skis or the like could be attached to the underpart of the tyres of the wheels 20 when device cannot operate on the solid ground.

With reference to the drawings the reference numeral 28 should be incorporated as part of the handle 26.

The embodiments of the invention in which an exclusive property or privilege is claimed are defined as follows:

1. A knock-down traction device for lifting and towing a trailer or the like comprising, a frame member in the form of a narrow strip of material formed to an arch-shaped configuration and having axially aligned passage means at opposite ends thereof, axle means releasably extending through said axially aligned passages of said frame and projecting outwardly therefrom, wheel means releasably mounted on each outwardly projecting end of said axle means, a tubular handle member one end mounted at the apex of said arch-shaped frame member and projecting rearwardly therefrom, a ball-shaped coupling releasably mounted at the apex of said arch-shaped frame, said ball-shaped coupling releasably securing said handle means with respect to said frame, said handle means having a first portion projecting rearwardly from said frame substantially at right angles to a first plane extending through said axle and centrally of the width of said arch-shaped frame member and a second portion projecting rearwardly from said first portion at an angle less than 90° with respect to said first plane in a second plane which projects substantially radially with respect to the axis of said axle means, said handle being movable in an arc between a first position in which said ball-shaped coupling is disposed at ground level on one side of a second plane which extends vertically through the center of the axle to engage a coupling element of a trailer and a second position on the other side of said second plane wherein said second portion of said handle is disposed at ground level, said ball-shaped coupling member being adapted to support a trailer in a stable elevated station when said handle is in said second position.

* * * * *